United States Patent [19]
von der Heide et al.

[11] Patent Number: 5,382,853
[45] Date of Patent: * Jan. 17, 1995

[54] BRUSHLESS DC DRIVE MOTOR WITH EXTERNAL ROTOR FOR USE IN DISC DRIVES AND LIKE DEVICES

[75] Inventors: Johann von der Heide, Schramberg; Rolf Müller; Alfred Merkle, both of St. Georgen, all of Germany

[73] Assignee: Papst Licencing GmbH, Germany

[*] Notice: The portion of the term of this patent subsequent to has been disclaimed.

[21] Appl. No.: 594,274

[22] Filed: Oct. 3, 1990

Related U.S. Application Data

[63] Continuation of Ser. No. 319,996, Mar. 7, 1989, abandoned, which is a continuation of Ser. No. 72,901, Jul. 14, 1987, abandoned, which is a continuation of Ser. No. 635,468, Jul. 27, 1984, abandoned, which is a continuation of Ser. No. 461,972, Jan. 26, 1983, abandoned, which is a continuation of Ser. No. 210,768, Nov. 26, 1980, abandoned.

[30] Foreign Application Priority Data

Jun. 6, 1980 [DE] Germany ............... 3031328

[51] Int. Cl.⁶ ............................................. H02K 7/00
[52] U.S. Cl. ............................... 310/67 R; 310/68 B; 310/156; 310/184; 318/254
[58] Field of Search ............... 310/68 R, 266, 156, 310/46, 68 B, 172, 192, 67 R, DIG. 3, 92, 91, 184; 318/138, 254, 439; 384/207.2, 207.25

[56] References Cited

U.S. PATENT DOCUMENTS

| | | | |
|---|---|---|---|
| 3,805,134 | 4/1974 | Osamu | 318/254 |
| 3,873,897 | 3/1975 | Müller | 318/138 |
| 4,092,572 | 5/1974 | Murata | 318/138 |
| 4,099,104 | 7/1978 | Müller | 318/138 |
| 4,280,072 | 7/1981 | Gotou | 310/67 R |
| 4,286,184 | 8/1981 | Kögler | 310/68 B |

FOREIGN PATENT DOCUMENTS 2346380 11/1974 Germany.
2804787 9/1978 Germany.

OTHER PUBLICATIONS

Brushless DC Disc Drive Spindle "Sextant", Rorton, Inc., Woodstock, N.Y., Nov. 17, 1980.
Zweipulsige Kollerktorlosegleichstrommotoren, Papst-Motoren KG., St. Gerogen, Germany, 1977.

Primary Examiner—R. Skudy
Attorney, Agent, or Firm—Fitch, Even, Tabin & Flannery

[57] ABSTRACT

A brushless DC drive motor with an external rotor has three pole shoes on a substantially ring-shaped stator for each two poles on the rotor. The stator winding is commutated by a three-phase commutation network in such a fashion that first, second and third networks in the stator winding are cyclically connected to an external DC source in accordance with rotor position. Each of the networks comprises at least one stator coil wrapped around a neck of a single corresponding one of the pole shoes.

28 Claims, 6 Drawing Sheets

BRUSHLESS DC DRIVE MOTOR WITH EXTERNAL ROTOR FOR USE IN DISC DRIVES AND LIKE DEVICES

CROSS-REFERENCES TO RELATED APPLICATIONS this application is a continuation of application Ser. No. 319,996 filed Mar. 7, 1989, which in turn was a continuation of Ser. No. 072,901 filed Jul. 14, 1987 which in turn was a continuation of Ser. No. 635,468 filed Jul. 27, 1984 which in turn was a continuation of Ser. No. 461,972 filed Jan. 26, 1983, which in turn was a continuation of Ser. No. 210,768 filed Nov. 26, 1980, now all abandoned.

BACKGROUND OF THE INVENTION

1. Field of the Invention

This invention pertains to drive motors such as are used in disc drives and like devices. More particularly, this invention concerns those drive motors which operate off DC sources and have external rotors which can support one or more discs in a disc drive.

2. Description of the Prior Art

A prior-art device of this type is now commercially available, and is denominated a "Sextant Brushless DC Disk Drive Spindle", and is available from Rotron Inc. as Model 4700. This device has a rotor with four poles and a stator comprising a multiplicity of overlapping coils.

This known device has certain disadvantage. From a physical standpoint, constructing the stator and the stator winding is a complicated matter. Since the individual coils of the stator winding overlap each other at the axial faces of the stator, the coil ends are long and bulky. Deep slots in the stator are necessary in order to allow overlapping of the individual stator coils. As a result, when it is necessary to fill the grooves with copper, a difficult task is presented. The space factor will be undesirably low. Furthermore, there is not much room available in the center of the stator into which a journal for the rotor may be introduced.

From an electrical standpoint, other disadvantages exist. The total resistance of the stator winding is relatively large, and at high drive motor voltages the overlapping between the individual stator coils can cause isolation problems to exist. Additionally, the motor constant $$k_M = \frac{k_E^2}{R}$$

(where $k_E$ is the ratio of voltage induced in the stator winding to the angular frequency of the rotor and R is the total resistance of the stator winding) is low, by virtue of the high R. Therefore, the prior-art device has a relatively low efficiency.

It would be advantageous to provide a drive motor of this type which would be easier to construct and which would have less bulky coil ends, in addition to a low resistance and a correspondingly higher efficiency. It would further be advantageous to provide a drive motor of this type in which interference problems caused by overlapping stator coils would not exist and which would allow to use a robust bearing system.

The invention of U.S. Ser. No. 06/060,879 could be applied advantageously in connection with this present invention and therefore is requested to be dealt with as part of it in combination. The benefit of such a combinatory use would result in a reduction of the magnetic stray-field flux upon neighbored heads.

SUMMARY OF THE INVENTION

These objects, along with others which will appear hereinafter, are achieved in this invention. In this invention, the stator winding includes a plurality of stator coils which are each wound around a single pole shoe of a first plurality of pole shoes of the stator and which form a first network, a second network and a third network. The stator is substantially ring-shaped. The pole shoes of the stator are generally T-shaped and are distributed at a regular pole pitch about a center axis. The pole shoes are separated from each other by a first plurality of gaps. The gaps are located between adjacent ends of adjacent pole shoes and are narrow in relation to the circumferential extension of each of the pole shoes. The rotor supports an annular permanent magnetic structure which has a second plurality of poles which alternate circumferentially in sense around the magnetic structure itself. The second plurality is so chosen that a fraction in which the first plurality is a numerator and the second plurality is a denominator will have a value of 1.5. Furthermore, three-phase brushless commutation means is connected to the first, second and third networks and connects them to an external DC source in accordance with rotor position.

Inasmuch as there is no overlap between the stator coils in either a physical or an electrical sense, no interference problems are presented. Additionally, the stator itself may be manufactured in an axially compact fashion by avoiding bulky stator coils and easily permitting slots between the stator poles to be filled with copper. Because the structure of the invention is compact, stator winding resistance is kept to a minimum and the efficiency of the invention is better than the efficiency known from the prior art.

A further advantage of the invention resides in so designing the stator that a relatively large central circular cavity is available into which a robust and very precise bearing journal may be introduced. This permits a mechanically stable pivotal connection between the rotor and the stator.

If desired, the pole shoes may be manufactured in an asymmetric shape in order to generate a reluctance torque during operation of the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

A fixed magnetic stator 10 is radially symmetrical about a center axis 10A. Stator 10 has an annular central region 10B, which surrounds a central cylindrical cavity 29. Six like generally T-shaped pole shoes 12A–12F extend radially outwardly from central region 10B at a regular pole pitch around the periphery of central region 10B, so that each two adjacent pole shoes such as 12A and 12B are displaced 60° from each other. The outermost edges of pole shoes 12A–12F can either be purely circular arcs or can (as shown in this embodiment) have notches 115, which notches 115 may be used to accommodate wires for purposes described below.

Stator 10 is manufactured in a laminar fashion from a stack of like metal plates which are relatively thin. Slots 20A–20F are defined as shown between each two adjacent pole shoes, so that, e.g., slot 20A is located intermediate pole shoes 12A and 12B. Slots 20A–20F permit the stator winding described immediately below to be wound around stator 10.

The stator winding is formed from stator coils 21–26. Stator coil 21 is wound around the neck 11A of pole shoe 12A beneath the T-shaped head thereof, and stator coil 22 is likewise wound around the neck 11D of pole shoe 12D. As is evident from FIG. 1, pole shoe 12A is diametrically opposed to pole shoe 12D, so that stator coil 21 and stator coil 22 are likewise diametrically opposed. Stator coil 21 is connected in series with stator coil 22 in order to define a first network in the stator winding.

Figure 1:
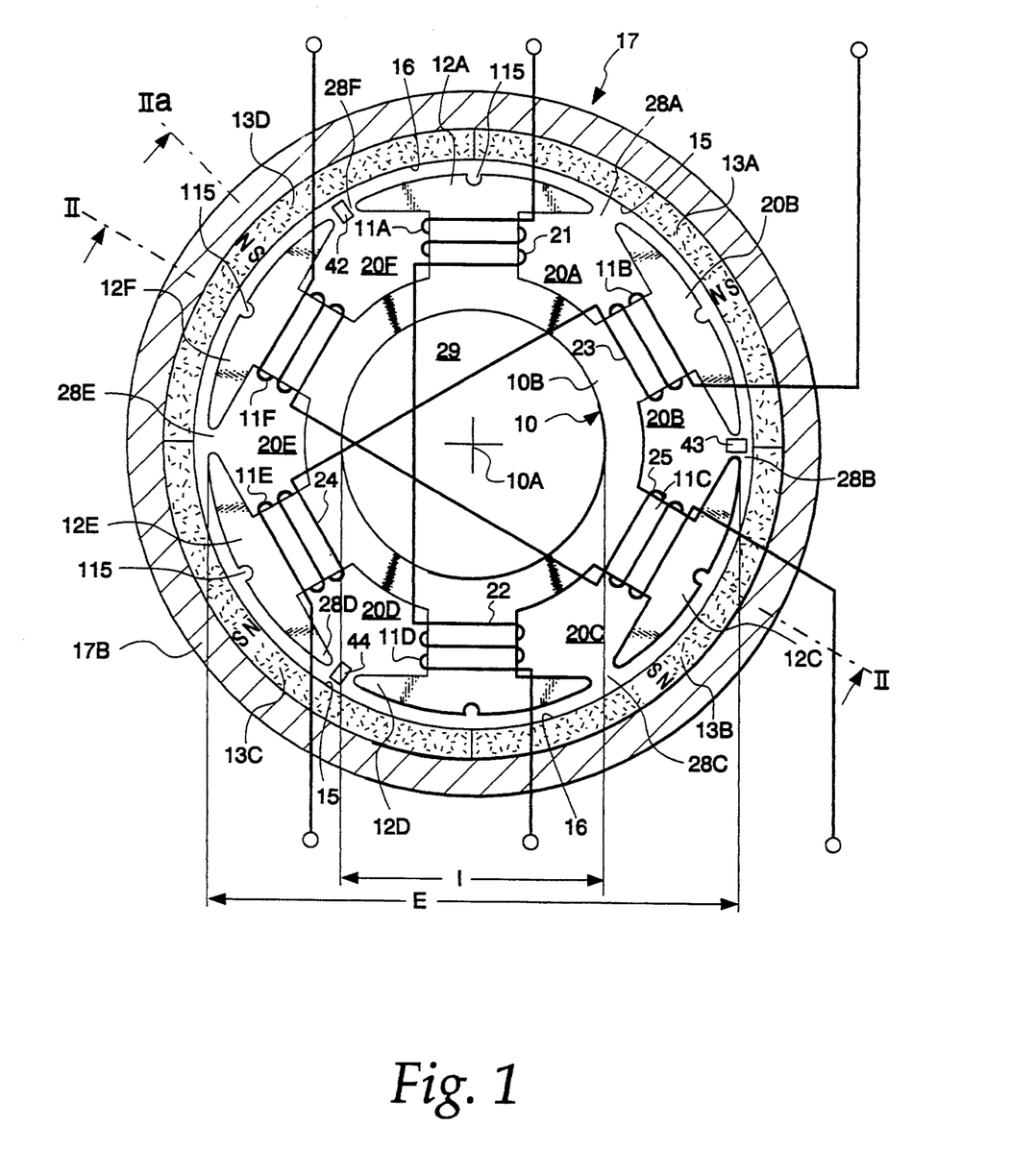
FIG. 1 shows a top view of a first embodiment of the invention in which the top of the rotor has been cut away.

In a similar fashion, stator coil 23 and stator coil 24 are wound around diametrically opposed necks 11B and 11E of pole shoes 12B and 12E, forming a second network in the stator winding. In exactly the same fashion, a third network is formed from diametrically opposed stator coils 25 and 26, which are wound around pole shoes 12C and 12F respectively.

Before proceeding further in this description of the preferred embodiments of the invention, it is appropriate to note that FIG. 1 is schematic in nature. Although stator coil 21 is shown to be connected to stator coil 22 by means of a wire extending across central cavity 29, it will be understood that this connection as shown is not accurate in the physical sense. As will become apparent immediately below, central cavity 29 is filled with a bearing journal 32–34 which prevents the electrical connections shown from taking place along the physical lines indicated in FIG. 1.

Figure 2:
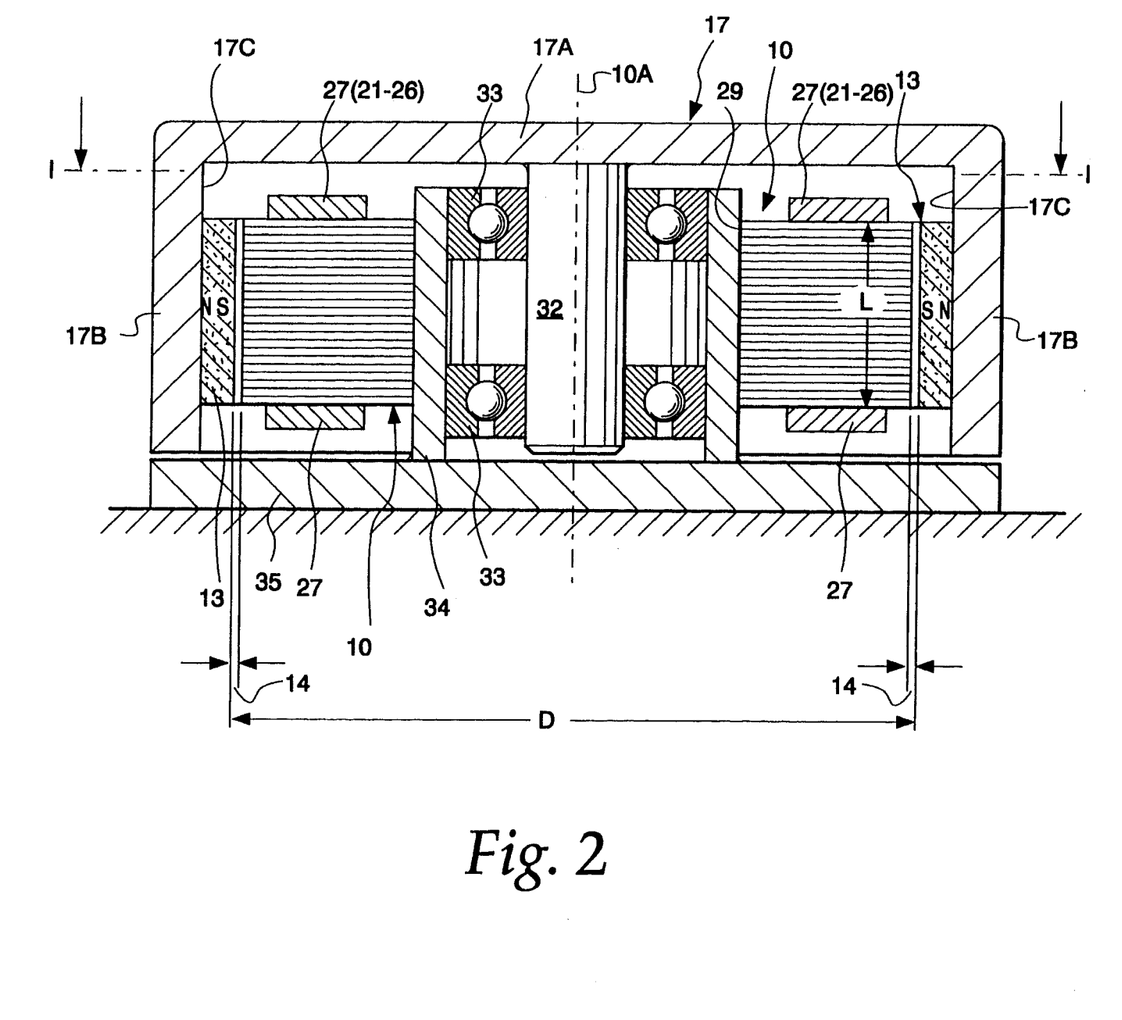
FIG. 2 shows a side elevational view of the embodiment shown in FIG. 1.
Figure 2A:
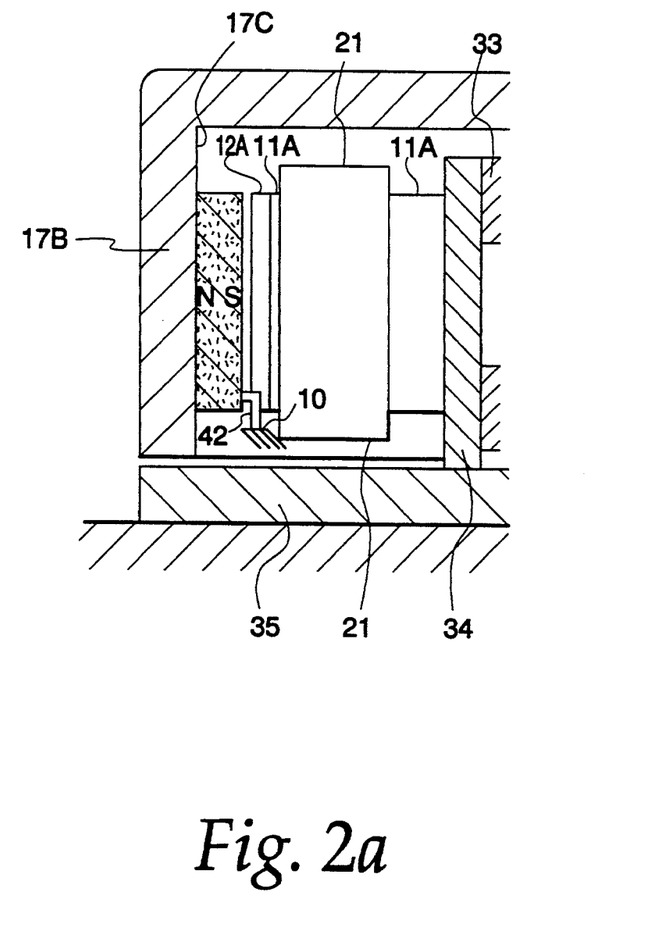

As can be seen in FIG. 2, stator 10 is mounted on cylindrical sleeve 34 which occupies central cavity 29. Sleeve 34 is supported by horizontal base plate 35. Additionally, sleeve 34 contains ball bearing journals 33, shown in FIG. 2 as being horizontally oriented.

A magnetic external rotor comprises an inverted cup-shaped rotor housing 17 with a horizontal top surface 17A and a cylindrical circumferential wall 17B. Stub shaft 32 is attached to the center of rotor housing 17 at the center of top 17A. Stub shaft 32 rides in ball bearing journals 33 and is supported thereby in a manner that rotor housing 17 is pivotally secured to stator 10 and can rotate about center axis 10A. As can be further seen in FIG. 2, circumferential wall 17B has an inner circumferential surface 17C which encircles stator 10 and stator coils 21–26

Annular and radially magnetized permanent magnetic structure 13 is affixed to inner circumferential surface 17C of rotor housing 17. Magnetic structure 13 may be constructed in a unitary fashion, or may be constructed of a plurality of like arcuate magnet segments. The former construction is shown in FIG. 1. As can be seen there magnetic structure 13 comprises four arcuate sections 13A–13D which are radially magnetized such that the inner circumferential surfaces of adjacent sections 13A–13D are of opposite polarities, wherein the magnetization varies in circumferential direction in a substantially rectangular or trapezoidal manner. Thus section 13A is radially magnetized so that its north pole 15 is radially inwardly. Magnet section 13B is radially magnetized so that its south pole 16 is radially inwardly. This alternation of the senses of magnetization is continued in magnet section 13C, which has its north pole 15 facing radially inwardly and in magnet section 13D which has its south pole 16 facing radially inwardly.

In the embodiment shown in FIG. 1, magnet sections 13A–13D each subtend 90° of arc and form four poles.

As the first, second and third networks in the stator winding are commutated in a fashion described below, magnetic forces acting between pole shoes 12A–12F will act on magnetic structure 13 and cause rotor housing 17 to rotate. It will be appreciated that it is not necessary for the practice of this invention for there to be exactly six pole shoes 12A–12F, nor that there be exactly four magnet sections 13A–13D. Thus, e.g., a useful drive motor will be obtained by providing a magnetic rotor structure having two poles, i.e. two oppositely radially magnetized magnet sections, and stator having three pole shoes each carrying one of the first, second and third networks. However, it will be noted that there are three pole shoes for each two poles in magnet structure 13. Thus, a first fraction in which the number of pole shoes is the numerator and in which the number of poles is the denominator will always have a value of 1.5.

Suitable materials for magnetic structure 13 or magnet segments corresponding to magnet sections 13A–13D include: magnetic material in a synthetic binder; a "rubber magnet" formed from a mixture of hard ferrite and an elastomeric material; ceramic magnetic material; and a compound containing samarium and cobalt. The unitary annular structure formed of "rubber magnet" such as described above is particularly advantageous.

In the embodiment shown in FIG. 1, each magnet section 13A–13D subtends 90° of arc and has a breadth corresponding to the pole pitch of the rotor.

It will be appreciated by those skilled in the art that it is necessary to provide a rotor position detector responsive to rotor position in order to cause commutation of the stator winding to take place at appropriate times. A suitable rotor position detector will include three sensors such as bistable Hall generators that are fixed on stator 10. In the embodiment shown in FIG. 1, bistable Hall generators are not shown, but they are indicated by reference numerals 42–44 in FIG. 3. Other rotor position detectors such as optical devices, field plates, and magnetic diodes may be used. When pole breadth substantially corresponds to the pole pitch of the rotor, the magnetic structure 13 may be used to actuate magnetic field sensors. I.e., in such an embodiment a separate control magnetic structure is not required to operate the magnetic field sensors. Advantageously, pole breadths will be set to correspond to not less than 67 percent of pole pitch and not more than 100 percent of pole pitch of the rotor. It is desirable to prevent pole breadth from decreasing below 67 percent of rotor pole pitch in order to ensure that the drive motor operates with sufficient power.

Figure 3:
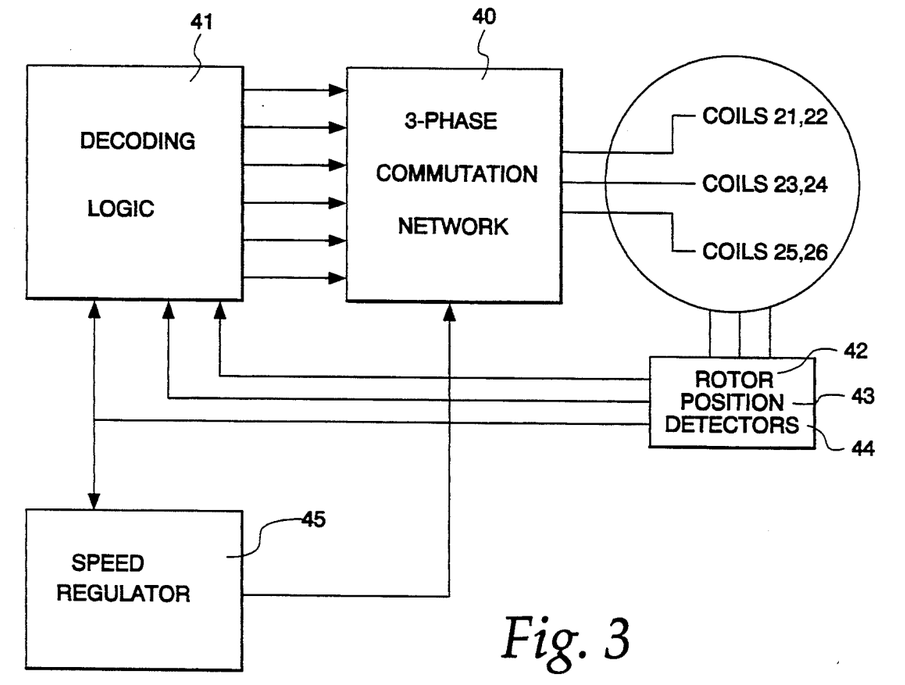
FIG. 3 shows a block diagram of control circuitry which drives the invention.

In the embodiment of the invention shown in FIGS. 1-3, commutation of the stator winding takes place by operation of three-phase commutation network 40. Commutation network 40 is driven by decoding logic 41, which latter is, in turn, driven by field sensors 42-44 installed in stator 10 to sense the position of rotor 17. Speed regulator 45 is connected to one of field sensors 42-44, to decoding logic 41, and to commutation network 40, in order to permit the drive motor to be operated accurately at a predetermined speed.

German Offenlegungsschrift 28 04 787 as well as U.S. Pat. No. 4,099,104 the disclosure of which is incorporated herein teach the use of early commutation in DC motors of this type. This principle can be applied to this invention by locating field sensors 42-44 not in the centers of pole shoes 12A-12F, but rather displaced from such centers in the counter-direction of rotation of rotor 17. This technique finds application to compensate for the effects of inductance in the stator winding which occurs as current flow through stator coils 21-26 increases.

Gaps 28A-28F are located between adjacent ends of adjacent pole shoes 12A-12F. For example, gap 28A is located between adjacent ends of pole shoes 12A and 12B. Gaps 28A-28F are narrow in relation to the circumferential extension (breadth) of each of the pole shoes. Advantageously, gaps 28A-28F are so dimensioned that each gap 28A-28F corresponds to between 2 percent and 20 percent of the circumferential extension of each of pole shoes 12A-12F.

The invention is so constructed that both spatial and electrical advantages are gained by properly dimensioning certain components. In particular, referring to FIG. 2, it can be seen that a cylindrical air gap 14 separates magnetic structure 13 inside rotor 17 from laminated stator stack 10. Stator stack 10 has a thickness L which is measured axially from the axial faces of stator stack 10. Coil ends 27 extending axially beyond stator stack 10 are formed by stator coils 21-26. Although FIG. 2 is not shown to scale, it will be appreciated that the height of stator coil ends 27 will directly affect the total axial dimension of the drive motor, especially in motors which utilize a thin stator 10. In the motor of the invention overlapping of stator coils 21-26 is avoided thereby minimizing the axial dimension of coil ends 27.

Magnetic structure 13 is thus separated from stator 10 by an air gap having a maximum diameter D. The invention is so dimensioned that a second fraction having L as a numerator and D as a denominator will have a value at most equal to one—i.e., the ratio L/D is less than or equal to one. Similarly, central cavity 29 has an interior diameter I, and stator 10 further has an exterior diameter E. Stator 10 is so constructed that a third fraction having I as a numerator and E as a denominator will have a value at least equal to 0.35, i.e., I/E is greater than or equal to 0.35. Preferably I/E is between 0.4 and 0.7.

Several advantages accrue from these dimensions. Overall resistance of the stator winding is held to a minimum and a large space is available for journalling the rotor in a stable and robust fashion.

Figure 4:
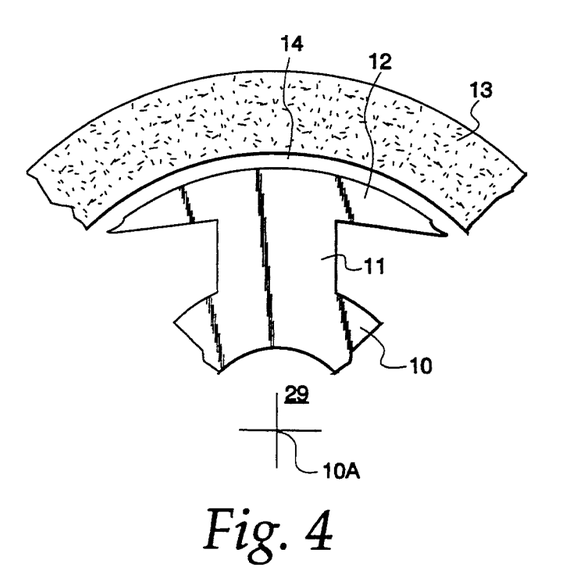
FIG. 4 shows a detail view of a second embodiment of the invention.

As an alternate embodiment, pole shoes 12A-12F can be manufactured asymmetrically, as is shown in FIG. 4, and as is more particularly described and explained in German Patent No. 23 46 380 as well as in U.S. Pat. No. 3,873,897 and in U.S. patent application 06/060,879 (Rolf Müller), the disclosure of which is incorporated herein. The pole shoe 12 is so shaped that when starting from a gap and continuing in a circumferential direction, air gap 14 reaches a maximum thickness in approximately 10° of arc. Thereafter, air gap 14 decreases in thickness during the following 60°-70° of arc until a minimum is reached, and thereafter increases until the original thickness is reached at the next gap. By virtue of this construction, a torque of reluctance is generated, which complements the torque which is generated by the motor windings. While such an embodiment is not required in a three-phase DC motor such as the one disclosed herein, it may be useful in other contexts, such as a six-pole, double-impulse, single-phase DC motor. (The term "double-impulse motor" as used herein has the meaning of "zweipulsiger Motor" as the latter term is used in a certain publication, "Zweipulsige kollektorlose Gleichstrommotoren", Dr.-Ing. Rolf Müller ASR-Digest för Angewandte Antriebstechnik, Vol. 1-2/1977.

If desired, small central notches 115 may be located centrally in the outer periphery of each pole shoe 12A-12F. In case of a three-phase motor this permits a winding (not shown) for a tachogenerator to be placed into such notches 115 so as to enable the third harmonic of the voltage induced in the stator winding to be taken off from the winding in notches 115 as an output.

The low resistance of the stator winding not only allows a higher efficiency to be achieved, but also correspondingly increases magnetic field strength, thereby increasing efficiency. The simple construction of stator 10 permits the invention to be manufactured more inexpensively, and the dimensions of the invention are so chosen that journalling of rotor 17 is stable and robust and overall size of the invention is still held to a minimum. Interference caused by physical overlapping between stator coils 21-26 is eliminated, thereby eliminating a possible source of interference problems.

Figure 5:
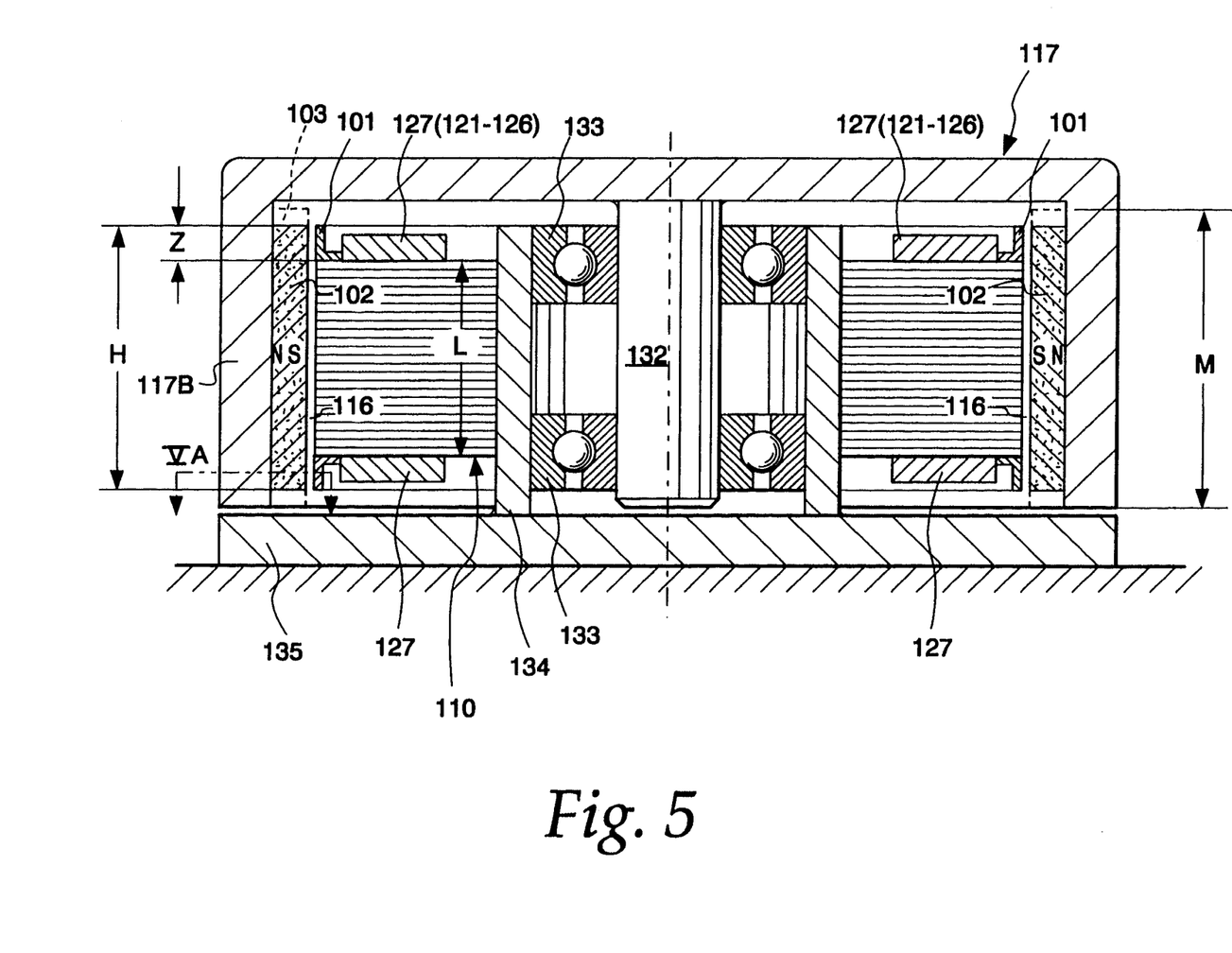
FIG. 5 shows a side elevational view similar to FIG. 2 of a further embodiment of the invention.
Figure 5A:
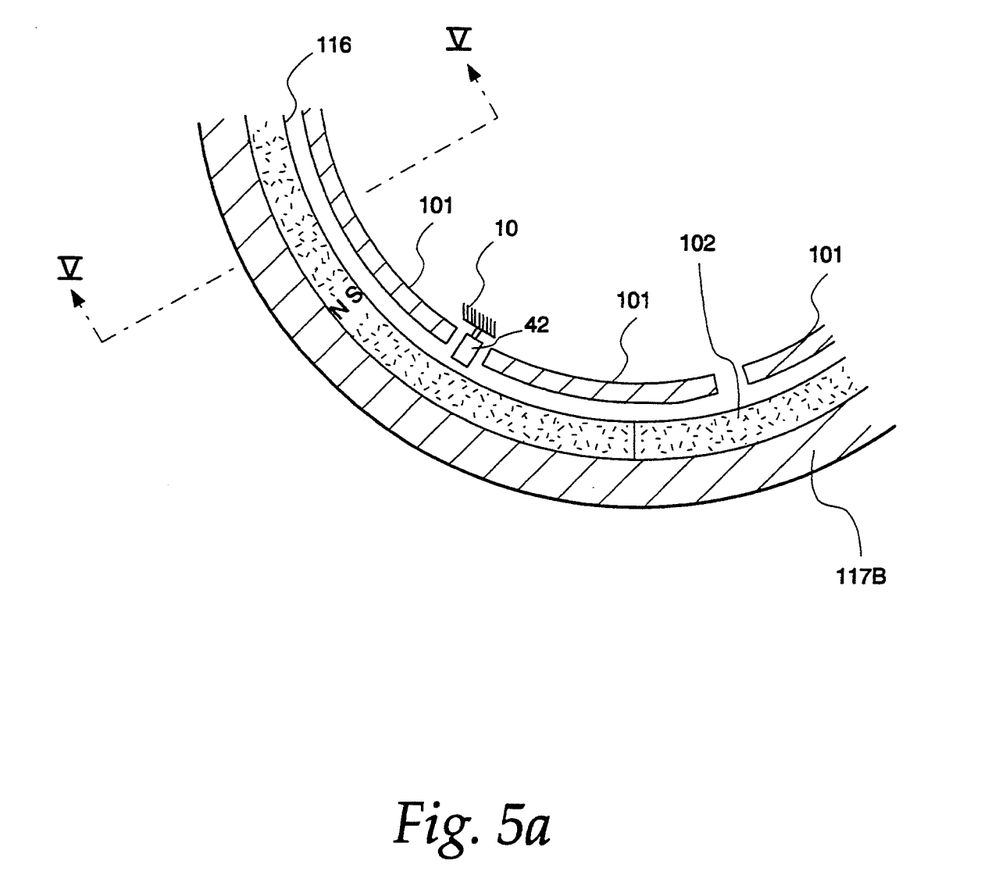

In the embodiment of the invention shown in FIG. 5 members corresponding to those shown in FIG. 2 are provided with corresponding reference numerals in the one hundred series. Different from the embodiment of FIG. 5, flux guide members 101 are attached to both axial end faces of the heads of pole shoes 112A-112F. Flux guide members 101 are L-shaped in cross section. The circumferential extension of each flux guide member 101 corresponds to that of the corresponding pole shoes 112A-112F. Flux guide members 101 are dimensioned so that the axial extensions Z thereof substantially correspond to that of the coil ends 127 of stator coils 121-126.

The magnetic structure 113 has an enlarged axial dimension when compared with that of the embodiment of FIG. 2. Thus, as indicated in FIG. 5 at 102, the axial dimension H of magnet structure 113 is at least equal to L+2Z. As illustrated in FIG. 5 by phantom lines at 103, the axial dimension of the magnetic structure 113 preferably may be increased to correspond substantially to the axial length of circumferential surface 117C of rotor housing 117 (dimension M in FIG. 5).

Flux guide members 101 function to pick up additional magnetic flux from magnet structure 113 and to guide such additional flux into the laminated stator stack 110. Accordingly, the axial space required to receive the coil ends 127 is utilized by the provision of flux guide members 101 and the axially extended magnetic structure 113 to direct the magnetic flux from the magnetic structure 113 of the rotor into the laminated stator stack 110.

The embodiment of FIG. 5 is of particular importance when the magnetic structure 113 is made of a mixture of magnetic material and an elastomeric binder, such as plastic material or rubber, because such a magnetic structure on the one hand is particularly inexpensive, but on the other hand results in the production of a magnetic field density lower than that obtained by use of a magnetic structure made of ceramic material.

The embodiment of FIG. 5 is of advantage in that, when compared with the embodiment of FIG. 2, a further reduction of the axial dimensions of the drive motor is possible while providing for the same motor output. On the other hand an increased motor output may be obtained when providing for the same axial motor dimension as in the embodiment of FIG. 2.

In the embodiment of FIG. 5, magnetic sensors 42, 43, 44 preferably are positioned in circumferential gaps between adjacent flux guide members 101.

Whereas pairs of stator coils 21, 22; 23, 24; and 25, 26 each are connected in series, it is also possible to connect coils 21 and 22, coils 23 and 24 as well as coils 25 and 26 of the first, second and third networks, respectively, in parallel. The first, second and third networks may be delta-connected, Y-connected or star-connected. Furthermore, each of coils 21–26 or 121–126 may be bifilarly wound.

It will be understood that each of the elements described above, or two or more together, may also find a useful application in other types of constructions differing from the types described above.

While the invention has been illustrated and described as embodied in a brushless DC drive motor with external rotor for use in disc drives and like devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A brushless DC drive motor of the type having a total number of phases divisible by three, comprising, in combination,
    a stator;
    a permanent-magnet rotor mounted on said stator for rotation relative thereto about a rotation axis, said rotor having a total of four rotor poles of which two are of a first magnetic polarity and the other two of an opposite magnetic polarity, the rotor poles of first polarity alternating circumferentially with the rotor poles of second polarity;
    a stator winding mounted on said stator and consisting of three pairs of non-overlapping stator coils; and
    rotor-position-dependent control means connected to the three pairs of non-overlapping stator coils for controlling energization of said three pairs of non-overlapping stator coils in dependence upon angular position of the rotor, and including rotor-position-detecting means located stationary with respect to said stator and operative for detecting the angular position of the rotor,
    wherein each pair of stator coils consists of two coils which are located diametrically opposite to each other and which are so wound and electrically connected that both are energized substantially simultaneously with identical magnetic polarity.

2. A motor as defined in claim 1,
    wherein said stator includes a generally annular structure having a center axis coinciding with said rotation axis, said structure being made of magnetically conductive material and having six radially outward extending pole structures spaced at intervals of substantially 60°, each pole structure being generally T-shaped and comprising a radially inward neck part of relatively narrow circumferential extent and a radially outward pole shoe part of relatively larger circumferential extent, the pole shoe parts of neighboring pole structures being circumferentially spaced from each other by intermediate gaps, the circumferential extents of said intermediate gaps being small compared to the circumferential extents of said pole shoe parts,
    said permanent-magnet rotor being an external rotor of annular shape encircling said pole shoe parts, said four rotor poles of said rotor being radially magnetized rotor poles,
    wherein each one of the six stator coils is wound around the neck part of a respective one of said generally T-shaped pole structures.

3. A motor as defined in claim 1 or 2, wherein the two coils of each pair of stator coils are electrically connected directly to each other.

4. A motor as defined in claim 3, wherein the two coils of each pair of stator coils are electrically connected together in series.

5. A motor as defined in claim 2, wherein each of said gaps has a circumferential extent corresponding to between two percent and twenty percent of the circumferential extent of each of said pole shoe parts.

6. A motor as defined in claim 2, wherein said generally annular structure comprises a stack of laminated plates of magnetically conductive material.

7. A motor as defined in claim 1 or 2, wherein said stator winding is a three-phase winding with each of the six stator coils being a monofilar coil.

8. A motor as defined in claim 2, wherein each rotor pole has a breadth corresponding to at least 67 percent and at most 100 percent of the 90° rotor pole spacing.

9. A motor as defined in claim 2, wherein each radially magnetized rotor pole has a radial magnetization that varies in a substantially rectangular manner in the circumferential direction.

10. A motor as defined in claim 2, wherein each radially magnetized rotor pole has a radial magnetization that varies in a substantially trapezoidal manner in a circumferential direction.

11. A motor as defined in claim 9, wherein said rotor poles are circumferentially consecutive portions of a bent flexible strip of permanently magnetized material.

12. A motor as defined in claim 10, wherein said rotor poles are circumferentially consecutive portions of a bent flexible strip of permanently magnetized material.

13. A motor as defined in claim 2, wherein said rotor poles are constituted by discrete respective arcuate magnet segments.

14. A motor as defined in claim 13, wherein the magnet segments are constituted of a material chosen from the following list of materials:
   magnetic material in a synthetic binder;
   a mixture of hard ferrite and an elastomeric material;
   ceramic magnetic material; and
   a compound containing samarium and cobalt.

15. A motor as defined in claim 1 or 2, wherein said rotor-position-detecting means comprises three magnetic-field-sensitive sensors mounted on said stator.

16. A motor as defined in claim 15, wherein each of said three sensors comprises at least one bistable Hall generator.

17. A motor as defined in claim 1 or 2, wherein each rotor pole as a circumferential extent corresponding to substantially 60°.

18. A motor as defined in claim 2, wherein each of the pole shoe parts varies proceeding in the circumferential direction to generate a reluctance torque during motor operation.

19. A motor as defined in claim 2, said generally annular structure comprising a stack of laminated plates of magnetically conductive material, said stack having an axial length L and being radially spaced from said rotor by a cylindrical air gap having a diameter D, wherein L is at most equal to D.

20. A motor as defined in claim 2, said generally annular structure comprising a stack of laminated plates of magnetically conductive material and having a central circular cavity having an interior diameter I, said generally annular structure furthermore having an outer diameter E, wherein I is at least equal to 35 percent of E.

21. A motor as defined in claim 20, wherein I is between 40 and 70 percent of E.

22. A motor as defined in claim 20, said external rotor comprising a cup-shaped rotor housing made of magnetically conductive material, a generally circular arrangement of radially magnetized permanent-magnet material secured on said rotor housing interiorly thereof and forming said rotor poles, and a coaxial stub shaft which is secured to said rotor housing and extends into said central circular cavity and is journaled for rotation within said cavity.

23. A motor as defined in claim 2, wherein said generally annular structure of said stator furthermore comprises flux guide structures which extend out in axial direction from both axial ends of said pole shoe parts.

24. A motor as defined in claim 23, wherein the circumferential extents of said flux guide structures substantially correspond to the circumferential extents of said pole shoe parts.

25. A motor as defined in claim 23, wherein the axial extension of said flux guide structures substantially corresponds to that of the coil ends of the stator coils.

26. A motor as defined in claim 23, wherein said rotor-position-detecting means comprises three magnetic-field-sensitive sensors mounted on said stator and located in respective gaps between neighboring flux guide structures.

27. A motor as defined in claim 2, wherein said rotor-position-detecting means comprises three magnetic-field-sensitive sensors mounted on said stator and located in respective gaps between neighboring pole shoe structures.

28. A brushless DC motor of the type having a total number of phases divisible by three, comprising, in combination,
   a stator;
   a permanent-magnet rotor mounted on said stator for rotation relative thereto about a rotation axis, said rotor having an even integer, $n_{rp}$, of rotor poles of which $n_{rp}/2$ are of a first magnetic polarity and the other $n_{rp}/2$ of an opposite magnetic polarity, the rotor poles of first polarity alternating circumferentially with the rotor poles of second polarity;
   a stator winding mounted on said stator and an even integer, $n_{sc}$, of non-overlapping stator coils disposed in pairs, wherein the number of non-overlapping stator coils, $n_{sc}$, is an even integer multiple of three and the ratio $n_{sc}/n_{rp}$ equals 3/2; and
   rotor-position-dependent control means connected to the pairs of non-overlapping stator coils for controlling energization of said pairs of non-overlapping stator coils in dependence upon angular position of the rotor, and including rotor-position-detecting means located stationary with respect to said stator and operative for detecting the angular position of the rotor,
   wherein each pair of stator coils consists of two coils which are located diametrically opposite to each other and which are so wound and electrically connected that both are energized substantially simultaneously with identical magnetic polarity.

* * * * *

Disclaimer 5,382,853—Johann von der Heide, Schramberg; Rolf Muller; Alfred Merkle, both of St. Georgen, all of Germany. BRUSHLESS DC DRIVE MOTOR WITH EXTERNAL ROTOR FOR USE IN DISC DRIVES AND LIKE DEVICES. Patent dated January 17, 1995. Disclaimer filed by assignee, Papst Licencing.

The term of this patent subsequent to July 24, 1998 has been disclaimed.

*(Official Gazette, June 10, 2003)*